T. V. BUCKWALTER.
TRACTION WHEEL.
APPLICATION FILED JAN. 4, 1912.

1,072,818.

Patented Sept. 9, 1913.

WITNESSES:

INVENTOR
Tracy V. Buckwalter
BY
Charles N. Butler
ATTORNEY

UNITED STATES PATENT OFFICE.

TRACY V. BUCKWALTER, OF ALTOONA, PENNSYLVANIA.

TRACTION-WHEEL.

1,072,818.   Specification of Letters Patent.   Patented Sept. 9, 1913.

Application filed January 4, 1912. Serial No. 669,327.

*To all whom it may concern:*

Be it known that I, TRACY V. BUCKWALTER, a citizen of the United States, residing at Altoona, in the county of Blair and State of Pennsylvania, have invented certain Improvements in Traction-Wheels, of which the following is a specification.

This invention relates to traction wheels of the twin tire type and its primary object is to provide such constructions with independently revoluble tires for the purpose of facilitating the turning of the wheels in steering.

The use of traction wheels having broad bearings is desirable in baggage trucks particularly, but such use has been rendered objectionable and the practicable breadth of the bearing reduced by reason of the resistance, sliding and wear involved in steering positively connected tires in irregular or curved courses.

My improvements provide the respective wheels with several tires supported by several rims independently revoluble upon an appropriate bearing so that each tire is permitted an independent movement in rounding curves with consequent reduction of wear, reduction of power necessary for driving, and reduction of effort necessary for steering.

The characteristic features of my invention are more fully disclosed in the following description and the accompanying drawings in illustration thereof.

Figure 1:
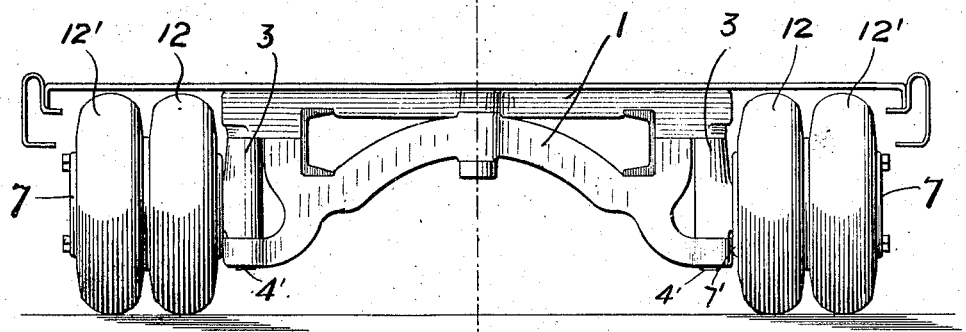
Figure 2:
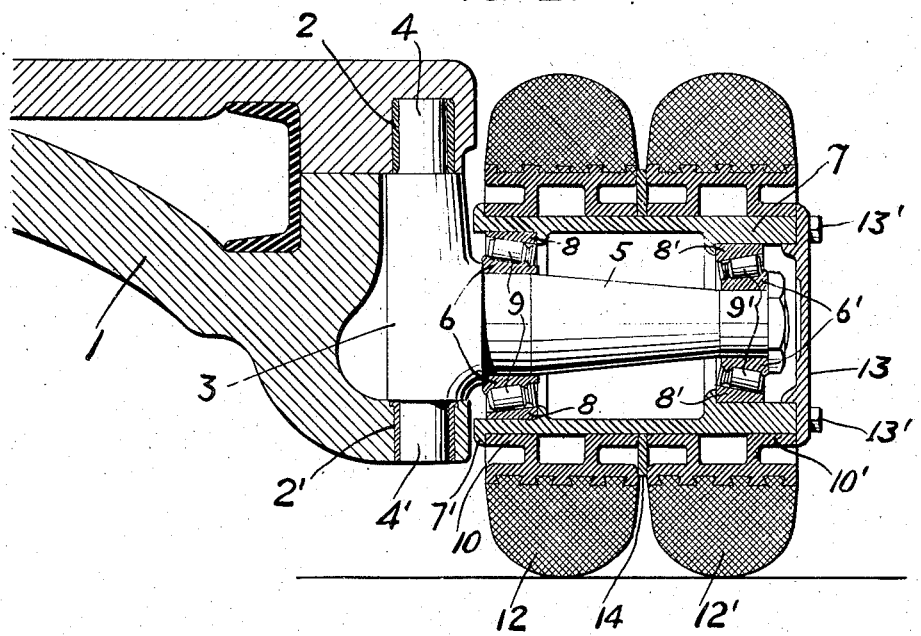

In the drawings, Figure 1 is an end view of a truck having wheels with twin tires mounted according to my invention, and Fig. 2 is a sectional view taken through the axis of a wheel.

The mechanism, as illustrated in the drawings, comprises the beam 1 having the bearings 2 and 2' in combination with the knuckles 3 having the journals 4 and 4' engaged in the respective bearings, each knuckle having the spindle 5 with the bearing rings 6 and 6' fixed thereon.

Each wheel comprises a drum 7 containing the rings 8 and 8', to which the load is transmitted from the spindle by the rollers 9 and 9', which engage the respective rings of the drum and spindle.

Rims 10 and 10', having thereon the respective tires or treads 12 and 12', are mounted on the drum and revoluble independently thereon; the rims being held against lateral movement by the flange 7' on the inner end of the drum, which engages the rim 10, the plate 13 fixed on the outer end of the drum by bolts 13' so as to engage the rim 10', and the ring 14 mounted on the drum between the two rims.

It will be understood that the foregoing arrangement, whereby each tire can turn on its drum independently, permits the use of any number of tires desirable for providing the wide bearing appropriate to the load and traction conditions while avoiding the objectionable friction, wear and resistance, particularly in turning sharply, in steering.

Having described my invention, I claim:

1. A traction wheel comprising, in combination with a spindle, a bearing revoluble on said spindle, and a plurality of treads revoluble independently on said bearing.

2. A traction wheel comprising, in combination with a spindle, a drum revoluble on said spindle, a plurality of rims revoluble on said drum and tires on the respective rims specified.

3. A traction wheel comprising, in combination with a knuckle having a spindle, a drum, anti-friction bearing means whereby said drum is revolubly mounted on said spindle, a plurality of rims revoluble independently on said drum, tires on the respective rims, and means for holding said rims in position on said drum.

4. A traction wheel comprising, in combination with a spindle having roller bearing rings thereon, a drum having roller bearing rings therein, rollers disposed between the respective rings on said spindle and in said drum, rims independently revoluble on said drum, tires on the respective rims aforesaid, a separator on said drum between said rims, and a detachable plate fixed on the outer end of said drum to hold said rims in position, said drum having a flange on the inner end thereof for holding said rims in position.

In witness whereof I have hereunto set my name this 21st day of December, 1911, in the presence of the subscribing witnesses.

TRACY V. BUCKWALTER.

Witnesses:
JAMES T. HANLON,
H. S. KELLY.